Patented Dec. 2, 1941

2,264,293

UNITED STATES PATENT OFFICE 2,264,293

VISCOSITY STABILIZATION OF POLYAMIDES

Merlin Martin Brubaker, Wilmington, Del., assignor to E. I. du Pont de Nemours & Company, Wilmington, Del., a corporation of Delaware No Drawing. Application September 29, 1938, Serial No. 232,472

8 Claims. (Cl. 260—78)

This invention relates to polymeric materials, and more particularly to improved fiber-forming polyamides.

The polyamides with which this invention is concerned are usually obtained by reacting diamines with dibasic acids or by polymerizing amino acids as described in Patents 2,071,250, 2,071,253, and 2,130,948. Other bifunctional polyamide-forming reactants also have been used for this purpose. These polymers are high molecular weight linear polyamides which are microcrystalline rather than resinous. They are capable of being spun from melt into filaments which upon cold-drawing (drawing at a temperature below their melting point) into fibers showing upon X-ray examination orientations along the fiber axis.

Of these polyamides, those that are most useful for the preparation of textile fibers have high melting points (200–300° C.). At the temperatures required to spin such polyamides from melt (generally 10 to 50° C. above their melting points), the polyamides tend to undergo further polymerization. This further polymerization makes it difficult to prepare uniform filaments from the polymer as the filaments first extruded from a sample of the polymer are of a lower molecular weight than those extruded near the end of the spinning operation. In order to obtain filaments of uniform denier throughout the spinning operation from such polymers, it is necessary to increase the temperature of the melt or increase the pressure used to extrude the molten polymer.

In order to overcome this difficulty it has been suggested previously to prevent further polymerization by using a small excess (generally 0.1 to 5 molar per cent) of either the diamine or the dibasic carboxylic acid in the preparation of the polyamide. This procedure results in a viscosity stable product whose terminal groups are essentially all amino or all carboxy groups, depending upon whether the diamine or dibasic carboxylic acid is used in excess. It has also been suggested to stabilize polyamides of both the above-mentioned types by including in the reaction mixture a mono-functional amide-forming compound or derivatives capable of functioning as such under the conditions of the reaction. This procedure gives viscosity stabilized polyamides whose terminal groups are essentially nonreactive alkyl groups. Although the affinity of the fibers for dyes is increased a further improvement in this direction would be possible if instead of a part of the terminal groups being alkyl groups not readily reactive toward dyes, these terminal groups contained only groups reactive toward dyes.

This invention has as an object a new and useful composition of matter. A further object is an improved polyamide composition which can be spun into fibers from melt without undergoing a substantial change in viscosity. A still further object is the preparation of polyamides which can be converted into fibers which possess unusual affinity for dyes. Other objects will appear hereinafter.

These objects are accomplished by heating a polyamide-forming composition in the presence of an hydroxy amine of the formula $H_2N-R-OH$ in which R is a divalent organic radical having a chain of two or three carbon atoms between the amino and hydroxyl groups under polymerizing conditions until a product of the desired properties is formed.

The term polyamide-forming composition as used herein designates a composition which yields a polyamide when heated to polymerizing temperature. Polyamide-forming compositions from which polyamides of the amino acid type can be obtained may consist of various materials in which molecules of the same substance combine through complementary amide-forming groups on each molecule. The fiber-forming composition yielding polyamides of the diamine-dibasic acid type includes a diamine and any one of several materials, the molecules of which carry or yield under the conditions of the reaction, two amide-forming groups complementary to the two amino groups of the amine. The reacting material of polyamide-forming compositions of the amino acid type includes monoamino monocarboxylic acids or amide-forming derivatives thereof (i. e., an ester, acid halide, anhydride, amide or lactam); and monoamino mononitriles in the presence of water. The reacting material of polyamide-forming compositions of the diamine-dibasic acid type comprises a diamine and a complementary amide-forming reactant such as a dibasic acid or its amide forming derivative, a dinitrile in the presence of water, a diisocyanate, a diisothiocyanate, a diurethane, a dithiodiurethane, or a tetrathiodiurethane.

The following examples, in which parts are given by weight, are illustrative of this invention.

Example I

A mixture of 21,000 parts of hexamethylenediammonium adipate, the salt derived from hexamethylenediamine and adipic acid, 53.6 parts of ethanolamine (B. P. 70–73° C. at 10 mm.) and 9,000 parts of distilled water was charged in a 10-gallon stainless steel autoclave. The autoclave was purged with oxygen-free nitrogen to remove substantially the last traces of air, sealed and then heated by means of a vapor bath (temperature of vapor about 290° C.). After about 2 hours heating the pressure in the autoclave reached 250 lbs. per sq. in., the temperature of the reaction mass at this point being about 210° C. The heating was continued but the pressure was maintained at 250 lbs. by bleeding off water vapor through a condenser until the temperature of the reaction mass reached 265° C., which is just above the melting point of the dry polymer. The pressure was then slowly reduced to atmospheric pressure and the reaction mass heated at 280° C. for 1.5 hours. The molten polymer was then discharged from the autoclave in ribbon form through a slit at the bottom of the autoclave. The extruded polymer was quenched in water during the ribbon-forming operation. The product had a melt viscosity of 600–800 poises at 287° C. and exhibited excellent fiber-forming properties.

Filaments were spun from melt at 280–285° C. through a spinneret having 11 orifices, each 0.007 in. in diameter, using a constant volume delivery pump of the type used in viscose spinning. The filaments were collected on a motor driven drum having a peripheral speed of about 1600 ft. per minute and continuously transferred to and collected on a second motor driven drum having a peripheral speed such that the filaments were cold drawn 0.25 per cent. The filaments were lustrous, silky, had an average denier of 13.6 g., a tenacity of 3.22 (g. per d.), and could be cold drawn continuously as much as 359 per cent. The fibers showed excellent affinity for dyes ordinarily used to dye wool and silk.

*Example II*

A mixture of 600 parts of hexamethylene diammonium adipate, 3.00 parts of ethanolamine, and 254 parts of distilled water was charged into a 1 liter stainless steel autoclave and lowered into a heating bath at 228° C. A small volume (3 to 4 cc.) of water was allowed to distil in order to displace the air in the autoclave, and then the autoclave was sealed. After about 0.5 hour the gauge pressure was 250 lbs. per sq. in. and the temperature of the reaction mass was 216° C. The temperature of the heating bath was gradually increased to 284° C. during the course of about 2 hours, the pressure being maintained at 250 lbs. by bleeding off water vapor. The temperature of the reaction mass gradually increased to 271° C. during the bleeding off of the water vapor. The pressure was then slowly reduced to atmospheric pressure during the course of about 0.5 hour, the temperature of the heating bath being maintained at 285° C. The reaction mass was then heated to 275° C. for 0.5 hour, the autoclave removed from the heating bath and allowed to cool to room temperature. The product had an intrinsic viscosity of 0.85, a melt viscosity of 190 poises at 287° C. and exhibited excellent fiber-forming properties.

Filaments were spun from melt at 280° C. under a pressure of 145 lbs. per sq. inch through a spinneret having 10 orifices, each 0.0078 in. in diameter. The filaments were collected on a motor driven drum having a peripheral speed of 1220 ft. per minute and continuously transferred to and collected on a second drum having a peripheral speed such that the fibers were cold drawn not more than 0.5 per cent. The filaments were lustrous, silky, had a denier of 8.5 g., a tenacity of 3.95 (g. per d.) and could be cold drawn continuously as much as 379 per cent. The fibers showed excellent affinity for dyes and could be dyed rapidly and permanently with dyes ordinarily used to dye wool and silk.

*Example III*

A mixture of 11.9 parts of ε-caprolactam and 0.06 part of ethanolamine was heated in a closed reaction vessel in an atmosphere of oxygen-free nitrogen at 250–270° C. during 33 hours. The product obtained in accordance with the foregoing procedure was a hard, tough solid which melted to a viscous liquid at about 200° C., had an intrinsic viscosity of 0.57, exhibited excellent fiber-forming properties and showed excellent affinity for dyes.

In addition to the polyamides mentioned in the examples, the invention with appropriate changes can likewise be used to prepare viscosity stable polyamides from any of the previously defined polyamide-forming compositions.

Although the preferred embodiment of this invention comprises heating the polyamide-forming composition until the resulting polymer exhibits fiber-forming properties, it is within the scope of this invention to discontinue the heating before that stage is reached. The low molecular weight or nonfiber-forming polymers are useful for certain applications.

The hydroxyamine is included in the polyamide-forming composition in amounts of from about 0.1 to 5.0 molar per cent based on the polyamide-forming composition. When the stabilizer of the present invention is used in polyamide-forming compositions in which the amino and complementary amide-forming groups are present in substantially chemically equivalent quantities, the viscosity of the polymer increases progressively, approaches a maximum, and then remains substantially constant. The ultimate viscosity of the polyamide obtained is dependent upon the amount of stabilizer added, i. e., the more stabilizer added the lower ultimate viscosity. The stabilizer may be added to the polyamide-forming reactants before, during, or after polymerization. Thus, it is possible to lower the viscosity of a preformed polyamide by heating it with a stabilizer. When the reaction with the stabilizer is complete the resultant polymer is essentially viscosity stable, i. e., its viscosity is not altered appreciably by further heating under normal polymerization conditions or at the temperature required for spinning the polymer from melt.

The further increase brought about by the present invention in the affinity of polyamides, and particularly fibers therefrom, for dyes ordinarily used for wool and silk, will be better understood by reference to the nature of the reaction involved. Beta- and gamma-hydroxyamines, i. e., 1,2- and 1,3-hydroxyamines of the general formula H₂N—R—OH, react with carboxy groups in a different way than do ordinary amines in that they form substituted oxazolines and oxazines, respectively. For example, polyamides stabilized with beta-ethanolamine, have a terminal group of structure:

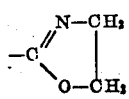

as compared to the terminal groups of polyamides stabilized with ethylamine:

—CO—NH—CH₂—CH₃

This difference in structure of the terminal groups, i. e., the presence of a reactive double bond, appears to account for the increased dyeing affinity of polyamides stabilized with 1,2- and 1,3-hydroxyamines. The presence of the reactive double bond at the terminal groups of the polymeric molecule offers a convenient point for attachment of the dye.

A valuable feature of the present invention is the preparation of polyamides in which both the terminal groups of the polymeric molecule are substituted oxazolines or oxazines since such groups serve as stabilizers and at the same time increase the affinity of the polyamide fibers for dyestuffs. This result can be obtained by adding in addition to the small excess of one of the complementary amide-forming reactants which has heretofore been used to improve stabilization, an amount of the hydroxyamine equivalent to the mentioned excess. Polyamides prepared by this method generally require less than 0.05 mol, preferably 0.005 to 0.03 mol, of the hydroxyamine stabilizer per mol of polyamide-forming composition. By a mol of the polyamide-forming composition, as applied to a diamine-dibasic acid mixture, is meant 1 mol of diamine and 1 mol of dibasic acid; in other words, one mol of the diamine-dibasic acid salt. More than 0.05 mol of stabilizer per mol of polyamide-forming composition can be used, however, when it is desired to prepare products of low viscosity. The quantity of stabilizer required to obtain a product of given intrinsic viscosity can be determined by experiment. When the quantity and conditions for the preparation of a given product have been determined the results can be duplicated fairly readily. For the preparation of fiber-forming polyamides, it is generally desirable to have the ultimate intrinsic viscosity of the polyamide not less than 0.5 when determined as described in Patent 2,130,948, although the polymeric carbamides exhibit fiber-forming properties when the intrinsic viscosity is as low as 0.2. The quantity of stabilizer necessary to prepare a product of given intrinsic viscosity [η] can be approximated by the following equation:

Mols stabilizer required=
$$\frac{\text{mol. wt. of P. F. C.} \times \text{mols of P. F. C.}}{16,000[\eta]}$$

in which P. F. C. refers to the polyamide-forming composition used.

The polyamides used in this invention can be prepared by the general methods described in the previously mentioned patents. Thus, it is possible to prepare the products of this invention by reacting polyamide-forming compositions with a 1,2- or 1,3-hydroxyamine of general formula H₂N—R—OH in the absence of a solvent, in the presence of an inert solvent such as a monohydric phenol, or in the presence of an inert nonsolvent such as a hydrocarbon. Mixtures of solvents and nonsolvents may also be used. The reaction is generally carried out in the neighborhood of 220–300° C. The reaction may be affected at ordinary, increased or decreased pressures. Often it is desirable, especially in the last stage of the reaction to employ conditions, e. g., reduced pressure, which will aid in the removal of the by-products of the reaction.

To prepare polyamides of the diamine-dibasic carboxylic acid type, it is advantageous to use the diamine-dibasic carboxylic acid salt, since this product is crystalline and easily obtained in pure form. However, the diamine may be reacted with a dibasic carboxylic acid or an amide-forming derivative of a dibasic carboxylic acid, i. e., ester, acid halide, amide, anhydride, or dinitriles in the presence of water. The invention, as already indicated, is applicable to the preparation of viscosity stable amino acid polymers, whether derived from the amino acid, the amino nitrile, or the lactam. The preparation of viscosity stable interpolymers, for example, those obtained by reacting an amino acid with a diamine-dibasic carboxylic acid mixture, or a mixture of diamine-dibasic carboxylic acid salts, or an amino acid with a lactam, or a diamine-dibasic carboxylic acid salt with a lactam, is also within the scope of this invention.

The examples illustrate the use of ethanolamine as a viscosity stabilizer which also serves to increase the affinity of the polymer for dyes. As additional examples of such stabilizers might be mentioned the following:

H₂N—CHCH₃—CH₂OH
H₂N—CH₂—CHCH₃—OH
H₂N—CHCH₃—CHCH₃—OH
H₂N—CH₂—C(CH₃)₂—OH
H₂N—C(C₂H₅)₂—CHCH₃—OH
NH₂CH₂CH₂CH₂OH
NH₂CH₂CHCH₃CH₂OH
H₂NCH₂C₆H₄CH₂OH orthoaminophenol; 3-amino-4-hydroxytoluene; 1-amino-2-naphthol and 2-amino-3-hydroxy naphthalene.

The invention herein described is very useful in the preparation of viscosity stable polyamides from polyamide-forming compositions in which the amino and complementary amide-forming groups are present in substantially chemically equivalent amounts. Diamines in which each amino nitrogen carries at least one hydrogen atom, preferably two, and in which the amino groups are separated by a divalent organic radical having a chain length of at least 4 atoms, the terminal atoms of said divalent organic radical being carbon atoms, and dicarboxylic acids, or amide-forming derivatives thereof, in which the carboxylic groups, or amide-forming derivatives thereof, are separated by a divalent organic radical having a chain length of at least 3 atoms, the terminal atoms of said radical being carbon atoms, are preferred. Dinitriles, which on hydrolysis yield the above defined dicarboxylic acids, in the presence of water are likewise useful. Monoaminomonocarboxylic acids, or amide-forming derivatives thereof, in which the amino nitrogen carries at least one hydrogen atom, preferably two, and is separated from the carboxylic group, or amide-forming derivative thereof, by a divalent organic radical having a chain length of at least 5 atoms, the terminal atoms of said divalent organic radical being carbon atoms, are also operative. Amino nitriles, which on hydrolysis yield the aforementioned amino acids, can be stabilized by the method of this invention and show excellent affinity for dyes. Polyamides prepared from diisocyanates, diisothiocyanates, diurethanes, dithiodiurethanes, and tetrathiodiurethanes in which the functional groups are separated by a divalent organic radical having a chain length of at least three atoms, the terminal atoms of said divalent organic radical being carbon, and operative diamines can also be stabilized by the method of this invention and exhibit excellent affinity for dyes.

The stabilized polyamides of this invention are valuable not only in melt spinning to obtain fibers having unusual affinity for dyes but they are also advantageous in spinning from solution and in other applications, for example, in the preparation of films, ribbons, bands, sheets, bristles, molded articles, and the like. Non-fiber-forming polyamides possessing increased affinity for dyes can be prepared by this invention and are particularly useful in the preparation of coatings, moldings, sizing, impregnating, adhesive, and related compositions.

In these and other uses, viscosity stabilized polyamides possessing unusual affinity for dyes may be admixed to advantage with other polymers, resins, plasticizers, pigments, etc.

As has been previously indicated, the stabilizing agents used in the present process yield polyamides showing marked improvement in reactivity toward dyes. The use of 1,2- and/or 1,3-hydroxyamines in the preparation of polyamides gives products containing terminal groups which are capable of serving as both stabilizer and acceptor for the dye. These hydroxyamines are relatively non-volatile compounds under the reaction conditions and hence show very little tendency to distill from the reaction mixture during the polymerization process.

As many apparently widely different embodiments of this invention may be made without departing from the spirit and scope thereof, it is to be understood that I do not limit myself to the specific embodiments hereof except as defined in the appended claims.

I claim:

1. A process for preparing synthetic polyamides of improved reactivity towards dyes, which comprises heating a polyamide-forming composition in the presence of 0.1 to 5.0 molar per cent of an hydroxyamine of formula $NH_2ROH$, in which R is a divalent organic radical consisting of a chain of two to three carbon atoms separating the amino and hydroxyl groups, at polymerizing temperatures until the product exhibits fiber-forming qualities.

2. A process for preparing substantially viscosity stable polyamides of improved reactivity toward dyes, which comprises heating at polymerizing temperatures a mixture comprising a 1,2-hydroxyamine containing a primary amino group, a diamine, and a substance of the class consisting of dicarboxylic acids and amide-forming derivatives of dibasic carboxylic acids, said diamine and substance being present in substantially equimolecular proportions.

3. The process set forth in claim 1 wherein said polyamide-forming composition comprises substantially equimolecular proportions of a diamine and a substance of the class consisting of dicarboxylic acids and amide-forming derivatives of dibasic carboxylic acids.

4. The process set forth in claim 1 wherein said polyamide-forming composition comprises a substance of the class consisting of monoaminomonocarboxylic acids and their amide-forming derivatives.

5. A process for the manufacture of fiber-forming synthetic polyamides of improved reactivity towards dyes, which comprises heating at polymerizing temperatures a substance of the class consisting of fiber-forming polyamides and polyamide-forming compositions capable of yielding said polyamides in the presence of an hydroxyamine which contains a primary amino group and in which the amino and hydroxyl groups are separated by a chain consisting of from two to three carbon atoms.

6. A composition of matter comprising a fiber-forming synthetic linear polyamide stabilized with an hydroxyamine of formula $NH_2ROH$, where R is a divalent organic radical consisting of a chain of two to three carbon atoms separating the amino and hydroxyl groups.

7. The composition of matter set forth in claim 6 in which said hydroxyamine stabilized fiber-forming linear polyamide contains a terminal oxazoline group.

8. The composition of matter set forth in claim 6 in which said hydroxyamine stabilized fiber-forming linear polyamide contains a terminal oxazine group.

MERLIN MARTIN BRUBAKER.